(12) United States Patent
Li

(10) Patent No.: US 7,609,870 B2
(45) Date of Patent: Oct. 27, 2009

(54) METHODS AND SYSTEMS FOR ENHANCING IMAGES

(75) Inventor: Jianying Li, New Berlin, WI (US)

(73) Assignee: General Electric Company, Schenectady, NY (US)

(*) Notice: Subject to any disclaimer, the term of this patent is extended or adjusted under 35 U.S.C. 154(b) by 878 days.

(21) Appl. No.: 10/925,317

(22) Filed: Aug. 24, 2004

(65) Prior Publication Data

US 2006/0045371 A1    Mar. 2, 2006

(51) Int. Cl.
*G06K 9/00* (2006.01)
*G06K 9/40* (2006.01)
(52) U.S. Cl. .................. 382/131; 382/128; 382/254
(58) Field of Classification Search ............. 382/128, 382/130–132; 378/4; 600/424, 427
See application file for complete search history.

(56) References Cited

U.S. PATENT DOCUMENTS

| 4,571,635 | A | 2/1986 | Mahmoodi et al. |
| 5,265,142 | A | 11/1993 | Hsieh |
| 5,594,767 | A | 1/1997 | Hsieh |
| 6,449,330 | B1* | 9/2002 | Li et al. .............. 378/4 |
| 7,177,483 | B2 | 2/2007 | Saund |
| 2003/0099405 | A1 | 5/2003 | Avinash et al. |

* cited by examiner

*Primary Examiner*—Duy M Dang
(74) *Attorney, Agent, or Firm*—Armstrong Teasdale LLP

(57) ABSTRACT

Methods and systems for enhancing an image including a plurality of image pixels are provided. The method includes segmenting the image by comparing an image pixel CT number to a plurality of predetermined thresholds. The methods further include filtering the plurality of image pixels based on the comparison and generating an output image based on the filtered image pixels.

16 Claims, 6 Drawing Sheets

METHODS AND SYSTEMS FOR ENHANCING IMAGES

BACKGROUND OF THE INVENTION

The invention relates generally to computer tomography (CT) imaging systems, and more particularly, to image filters in CT lung applications.

In Computer Tomography (CT) imaging systems, typically an X-ray source emits a fan-shaped beam towards a scan subject, such as a patient. The beam, after being attenuated by the scan subject, impinges upon an array of radiation detectors, which, in turn produce electrical signals indicative of the attenuated beam. The electrical signals are then transmitted to a data processing unit for analysis and image reconstruction.

Various techniques to reconstruct CT images, such as CT lung images, are known. These techniques involve dividing each acquired CT image slice into a matrix of volume elements (voxels). Each voxel may be traversed during the scan by numerous X-ray photons, and the intensity of the transmitted radiation is measured by the detectors. These intensity readings are used to calculate the density or attenuation value of a body part such as a tissue at each point in the slice. Specific attenuation values are assigned to each individual voxel. In addition, each image pixel is assigned a numerical value (CT number), which is the average of all the attenuation values contained within the corresponding voxel. The final image is then reconstructed from the matrix of image voxels as a corresponding matrix of picture elements (pixels).

In order to enable the visualization of minute parts of the reconstructed image, such as those representing vessels and tumors in the lung, both, a good contrast and a good spatial resolution are required. In high contrast CT images, an absolute difference between two objects in the image may be easy to perceive. In addition, a good spatial resolution ensures that even very minute structures within an object in the image are easily identifiable.

However, enhancing CT image contrast often leads to an increase in the overall image noise. An increase in the image noise leads to random variations in intensity across homogeneous objects of the image. Various high scan techniques, for enhancing contrast in CT images while maintaining low image noise, are known. However, these high scan techniques lead to a high radiation dose being. subjected to patients.

BRIEF DESCRIPTION OF THE INVENTION

In an exemplary embodiment, a method for enhancing an image that includes a plurality of image pixels is provided. The method includes segmenting the image by comparing an image pixel CT number to a plurality of predetermined thresholds. The method further includes filtering the plurality of image pixels based on the comparison and generating an output image based on the filtered image pixels.

In another exemplary embodiment, a computed tomography (CT) system is provided. The system includes a computed tomography scanner, and a controller for controlling the operation of the computed tomography scanner to enhance a CT image having a plurality of image pixels. The controller is configured to segment the image by comparing an image pixel CT number of the plurality of image pixels to a plurality of predetermined thresholds, filter the plurality of image pixels based on the comparison, and generate an output image based on the filtered image pixels.

DETAILED DESCRIPTION OF THE INVENTION

Various embodiments of the invention provide a method for enhancing an image that includes a plurality of image pixels. The image may be enhanced by increasing its contrast to noise ratio, thereby enabling better visualization of minute parts of the image. In various embodiments of the invention, a post processing method for medical applications, such as CT lung application, that enhances contrast of vessels and tumors in lungs and reduces noise of the surrounding lung tissues, is described.

Figure 1:
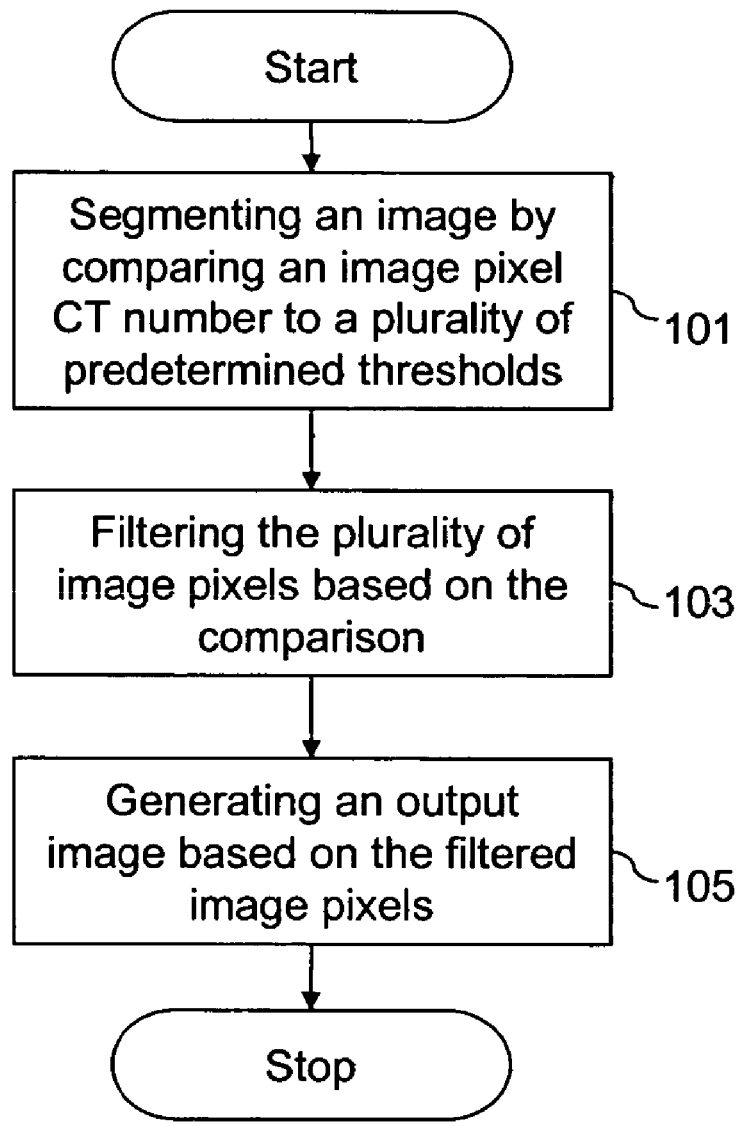
FIG. 1 is a flowchart illustrating a method to enhance an image, in accordance with an exemplary embodiment of the invention.

FIG. 1 is a flowchart illustrating a method to enhance an image, in accordance with an exemplary embodiment of the invention. The image is composed of a plurality of image pixels and each image pixel has a CT number associated with it. At 101, the image is segmented by comparing an image pixel CT number to a plurality of predetermined threshold values. The threshold values depend on the type of image application. For example, the threshold values for a CT lung application may be different from the threshold values determined for a CT heart application.

At 103, the pixels of the segmented image are filtered based on the comparison. In an embodiment, filtering includes image smoothing and deconvolution operations. At 105 an output image is generated using the filtered image pixels. The output image is an enhanced image, which enables better visualization of the minute parts of the image.

Figure 2:
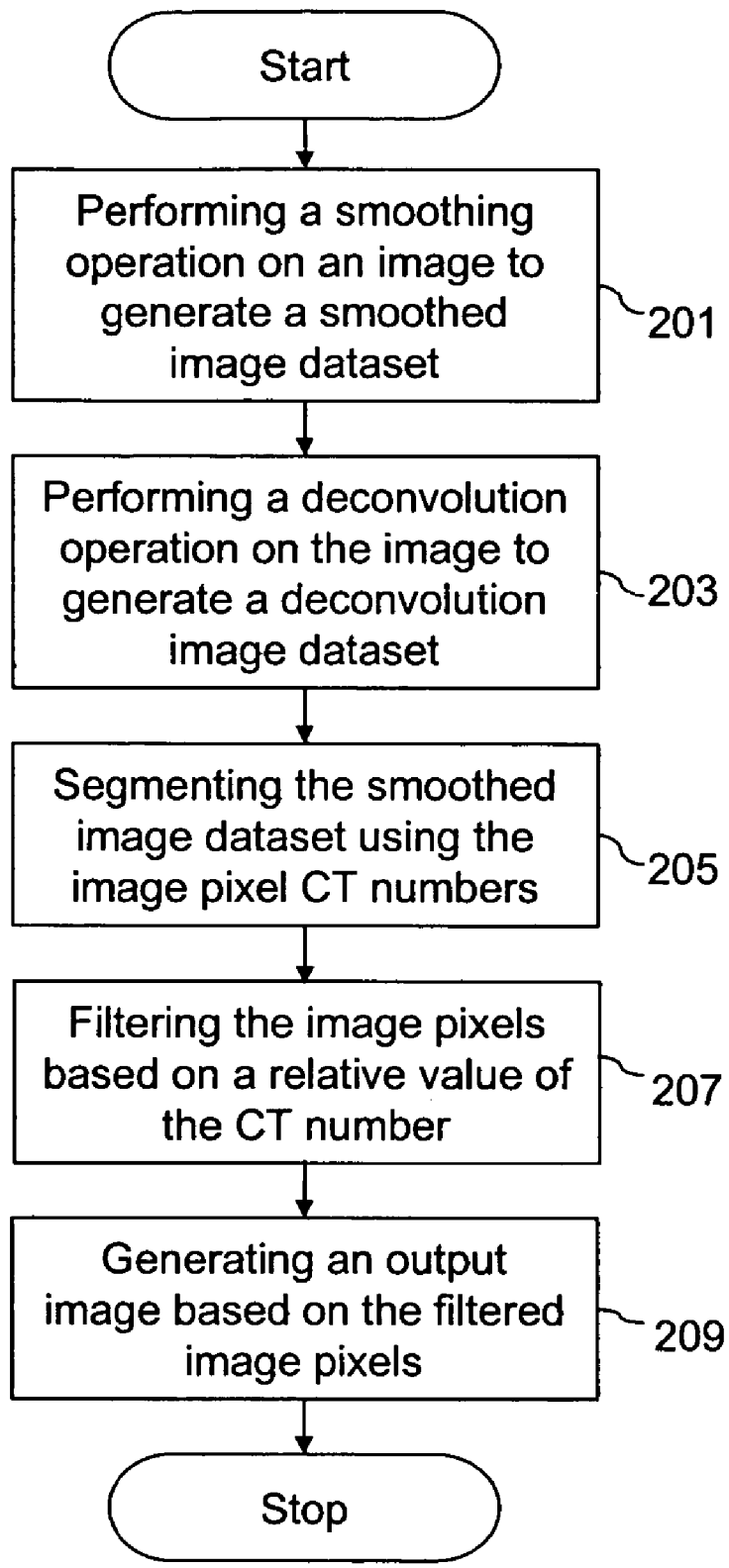
FIG. 2 is a flowchart illustrating a method to enhance an image, in accordance with another exemplary embodiment of the invention.

FIG. 2 is a flowchart illustrating a method to enhance an image, in accordance with another exemplary embodiment of the invention. The image is composed of pixels, and each pixel is associated with a CT number. In an embodiment of the invention, the image is a medical image, such as images used in CT Lung applications.

At 201, a smoothing operation is performed on an original image (im) to generate a smoothed (im_s) image dataset. In various embodiments of the invention, standard smoothing algorithms such as Gaussian filter, Uniform filter, Triangular filter, and the like are used, in order to reduce noise and prepare the original image (im) for further processing such as segmentation. In an embodiment of the invention, the smoothing operation is performed by averaging the CT numbers of a plurality of adjacent image pixels.

At 203, a deconvolution operation is performed on the original image (im) to generate a deconvolution (im_d) image dataset. In various embodiments of the invention, standard deconvolution algorithms such as Empirical Point-spread function, Calculated Point-spread function, Nearest Neighbor algorithm, and the like are used, in order to remove out of focus light and sharpen the original image (im).

In an embodiment, the deconvolution (im_d) image dataset is further modulated by a gain factor by using a polynomial expression based on the pixel value relative to a pre-defined threshold. Therefore, im_d is expressed as:

$$im\_d = im - (im - \text{decon}(im))*\text{gain\_decon} \quad (1)$$

where decon(*) denotes deconvolution operation, and the gain_decon is expressed as:

$$\text{gain\_decon} = \sum_{k=0}^{m} a(k) \cdot tval^k \text{ where } tval = \frac{im(i,j)}{t\_low} \quad (2)$$

where a(k) represents polynomial coefficients and t_low represents a low threshold. In an embodiment, the values assigned to parameters in equation (2) are m=5, a(1)=0.378, a(2)=13.02, a(3)=−38.16, a(4)=44.193, and a(5)=−18.93. The gain_decon factor has value of zero for tval=0, and 0.5 for tval=1 and a maximum value of 1 around tval=0.75.

At 205, the smoothed image dataset (im_s) is segmented based on a plurality of predetermined threshold values. The smoothed image dataset (im_s) is segmented by using the CT numbers of the image pixels.

At 207, the smoothed image dataset (im_s) pixels are filtered based on the relative value of their CT number. In various embodiments, filtering is performed by applying a different filter to each segment. In an embodiment, image pixels with CT numbers smaller than a predetermined low threshold are smoothed, whereas image pixels with CT numbers greater than a predetermined high threshold are assigned the value of the corresponding pixel in the original image (im). The image pixels that have CT numbers between the predetermined high and the low thresholds are filtered by using a deconvolution function.

At 209, an output image is generated by using the filtered pixels. In various embodiments of the invention, the filtered pixels are modulated by using a gain factor, in order to ensure that the smoothing and deconvolution operations have little impact on the image pixels near the edge of the output image. In an embodiment of the invention, the gain factor is a function of the position of an image pixel. In another embodiment of the invention, the gain factor is a function of the CT number of an image pixel.

Figure 3A:
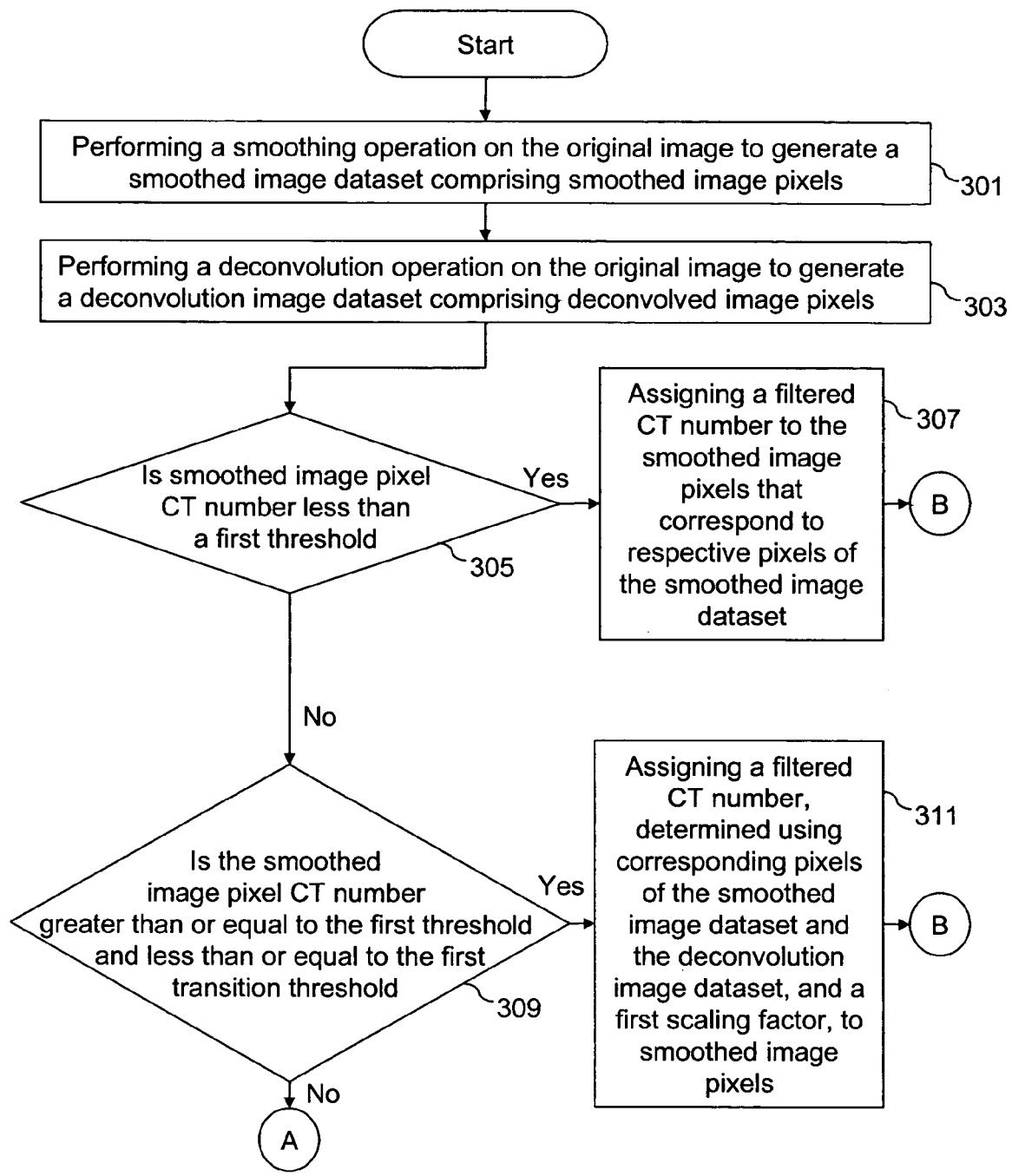
FIGS. 3a and 3b is a flowchart illustrating a method to enhance an image, in accordance with yet another exemplary embodiment of the invention.
Figure 3B:
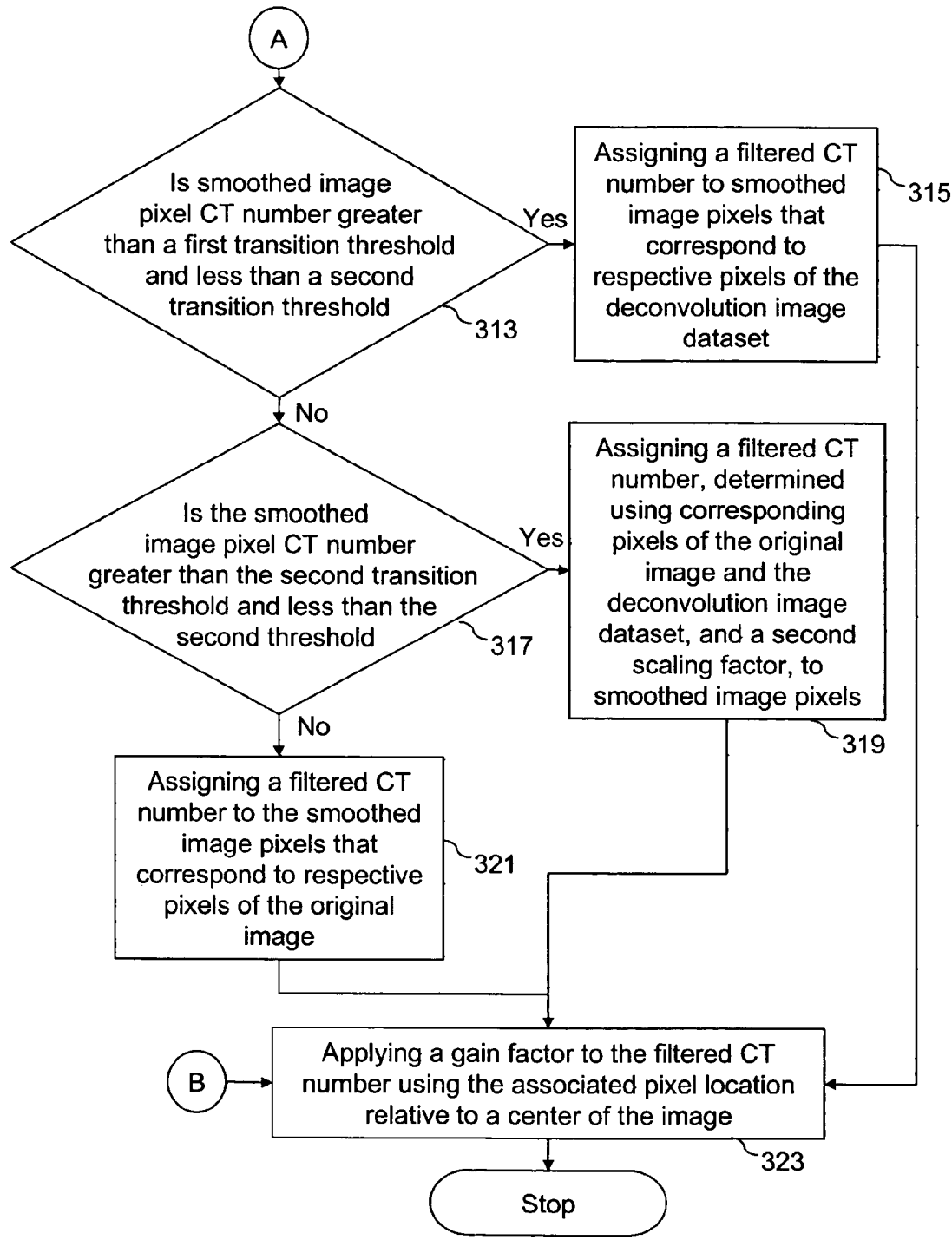

FIGS. 3a and 3b is a flowchart illustrating a method to enhance an image, in accordance with yet another exemplary embodiment of the invention. At 301, a smoothing operation is performed on an original image (im) to generate a smoothed (im_s) image dataset. At 303, deconvolution operation is performed on the original image (im) to generate a deconvolution (im_d) image dataset.

The smoothed image dataset (im_s) is segmented based on a plurality of predetermined threshold values. In various embodiments of the invention, four sets of threshold values, for example, low (t_low), high (t_high), and transition threshold values (t_tran1) and (t_tran2) are established. In an embodiment of the invention, the threshold values for CT Lung applications, for example, are as follows: t_high=−100, t_tran2=−150, t_tran1=−500 and t_low=−800. The low threshold value (t_low) signifies the background region of an image whereas the high threshold (t_high) signifies the soft tissue region in an image. The transition thresholds (t_tran1 and t_tran2) are established in order to make an enhanced output image look natural and have no abrupt transition regions.

The smoothed image dataset (im_s) pixels are filtered based on their CT numbers. At step 305, it is determined whether the CT number of the smoothed image pixel is less than t_low. If the CT number of the smoothed image pixel is less than t_low, then at 307, an output image pixel (im_o) is obtained by assigning to it a filtered CT number corresponding to an image pixel of the smoothed image dataset. In an embodiment of the invention, this filtering is represented as:

$$\text{if } im\_s < t\_low, \text{ then } im\_o = im\_s. \quad (3)$$

Assigning im_s to im_o ensures that the background of output image im_o is smoothed.

If the CT number of smoothed image pixel is not less than t_low, then at 309, it is determined whether the CT number of smoothed image pixel is greater than or equal to t_low and less than or equal to t_tran1. If the CT number of smoothed image pixel is greater than or equal to t_low and less than or equal to t_tran1, then at 311, an output image pixel (im_o) is obtained by assigning to it a filtered CT number, determined by using corresponding pixels of the smoothed image dataset (im_s) and the deconvolution image dataset (im_d), and a first scaling factor. The first scaling factor is determined by interpolating the pixel CT number between the first predetermined threshold and the first transition threshold. In an embodiment of the invention, the first scaling factor is determined by using the equation:

$$\text{scale1} = 3.0*t^2 - 2.0*t^3 \text{ for } t\_low \leq \text{pixel} < t\_trans1, \text{ where}$$
$$t = (\text{pixel} - t\_low)/(t\_trans1 - t\_low) \quad (4)$$

In an embodiment, this filtering is represented as:

$$\text{if } t\_low <= im\_s <= t\_tran1, \text{ then } im\_o = im\_s + (im\_d - im\_s)*\text{scale1} \quad (5)$$

If the CT number of smoothed image pixel is not greater than or equal to t_low and less than or equal to t_tran1, then at 313, it is determined whether the CT number of smoothed image pixel is greater than t_tran1 and less than t_tran2. If the CT number of smoothed image pixel is greater than t_tran1 and less than t_tran2, then at 315, an output image pixel (im_o) is obtained by assigning to it a filtered CT number corresponding to a pixel of the deconvolution image dataset. In an embodiment of the invention this filtering is represented as:

$$\text{if } t\_tran1 < im\_s < t\_tran2, \text{ then } im\_o = im\_d \quad (6)$$

If the CT number of smoothed image pixel is not greater than t_tran1 and less than t_tran2, then at 317, it is determined whether the CT number of smoothed image pixel is greater than or equal to t_tran2 and less than or equal to t_high. If the CT number of smoothed image pixel is greater than or equal to t_tran2 and less than or equal to t_high, then at 319, an output image pixel (im_o) is obtained by assigning to it a filtered CT number. The output image pixel is determined by using the corresponding original image (im) and the deconvolution image dataset (im_d), and a second scaling factor. The second scaling factor is determined by interpolating the pixel CT number between the second predetermined threshold and the second transition threshold. In an embodiment of the invention, the second scaling factor is determined using the equation:

$$\text{scale2} = 3.0*t^2 - 2.0*t^3 \text{ for } t\_trans2 \leq \text{pixel} \leq t\_high,$$
$$\text{where } t = (\text{pixel} - t\_trans2)/(t\_high - t\_trans2) \quad (7)$$

This filtering is represented as:

$$\text{if } t\_tran2 <= im\_s <= t\_high, \text{ then } im\_o = im\_d + (im - im\_d)*scale2. \qquad (8)$$

If the CT number of smoothed image pixel is not greater than or equal to t_tran2 and less than or equal to t_high, it is greater than t_high. At 321, an output image pixel (im_o) is obtained by assigning to it a filtered CT number corresponding to a pixel of the original image (im). In an embodiment of the invention, this filtering is represented as:

$$\text{if } im\_s > t\_high, \text{ then } im\_o = im. \qquad (9)$$

At step 323, the output image pixels (im_o) are modulated by a gain factor in order to obtain the final output image (im_out). Modulation of im_o is performed to ensure that the smoothing and deconvolution operations do not have much impact on the pixels near the edge of the original image. In an embodiment of the invention, the gain factor is a polynomial expression that is based on the position of a pixel relative to the centre of the image. The position dependent gain factor (gain_pd) has a value of 1 near the image center and gradually rolls off to 0 towards the edges. An example of the gain factor as a function of pixel location (i,j) is as follows:

$$gain\_pd(ij) = 1.0 + 0.16*dt - 2.75*dt^2 + 12.2*dt^3 - 18.9*dt^4 + 8.1*dt^5 \qquad (10)$$

In another embodiment of the invention, the gain factor is expressed as a polynomial expression based on the pixel location relative to the center of the image:

$$gain\_pd = \sum_{k=0}^{n} b(k) \cdot dt^k \qquad (11)$$

Where $dt = ((i-255)^2 + (j-255)^2)^{0.5}/256$, for 512×512 image matrix size.

Figure 4:
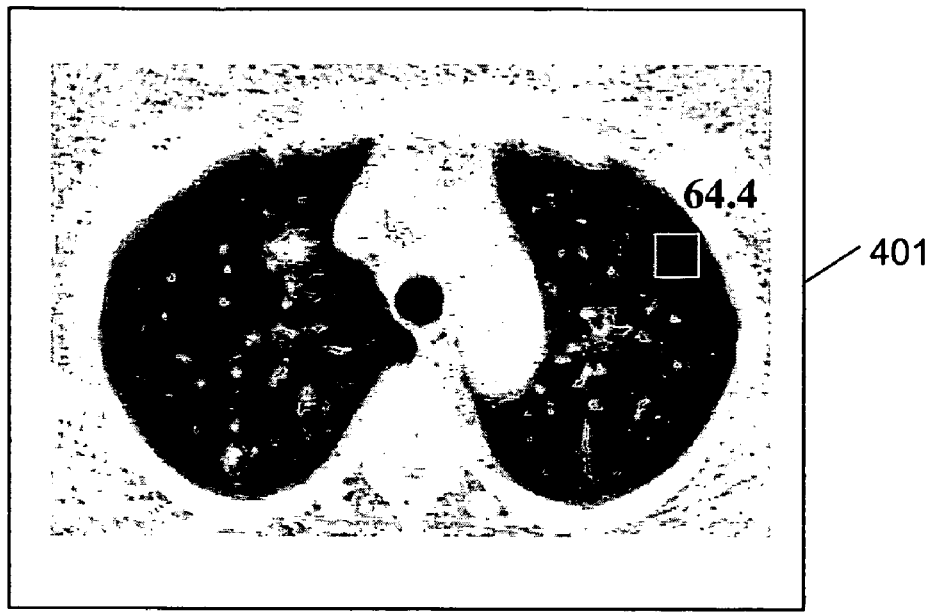
FIG. 4 illustrates a lung scan image obtained by using known image reconstruction techniques and an exemplary lung scan image obtained by using the enhanced filtering described in various embodiments of the invention.
Figure 4:
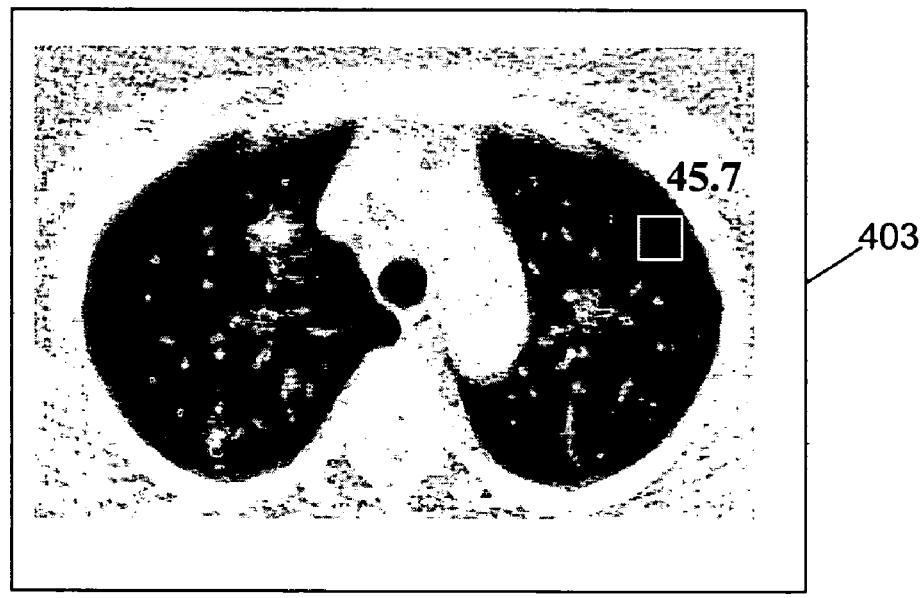

FIG. 4 illustrates exemplary lung scan images. Lung scan image 401 is obtained by using known image reconstruction methods. Lung scan image 403 is obtained by using enhanced post processing filtering in an embodiment of the invention. Lung scan image 403 illustrates sharper images of the vessels and nodules in the lungs than 401. In addition, the enhanced post processing filtering, in various embodiments, reduces the standard deviation of the lung tissues surrounding the vessels and nodules, as depicted by lung scan images 401 and 403. The reduction of the standard deviation enables reduction in noise, smoothing and enhancing of the contrast of minute parts of the image. Lung scan image 401 has a CT number standard deviation value of 64.4 whereas lung scan image 403 has a CT number standard deviation value of 45.7. Therefore, lung scan image 403 has an improved contrast to noise ratio of the lung nodules.

Figure 5:
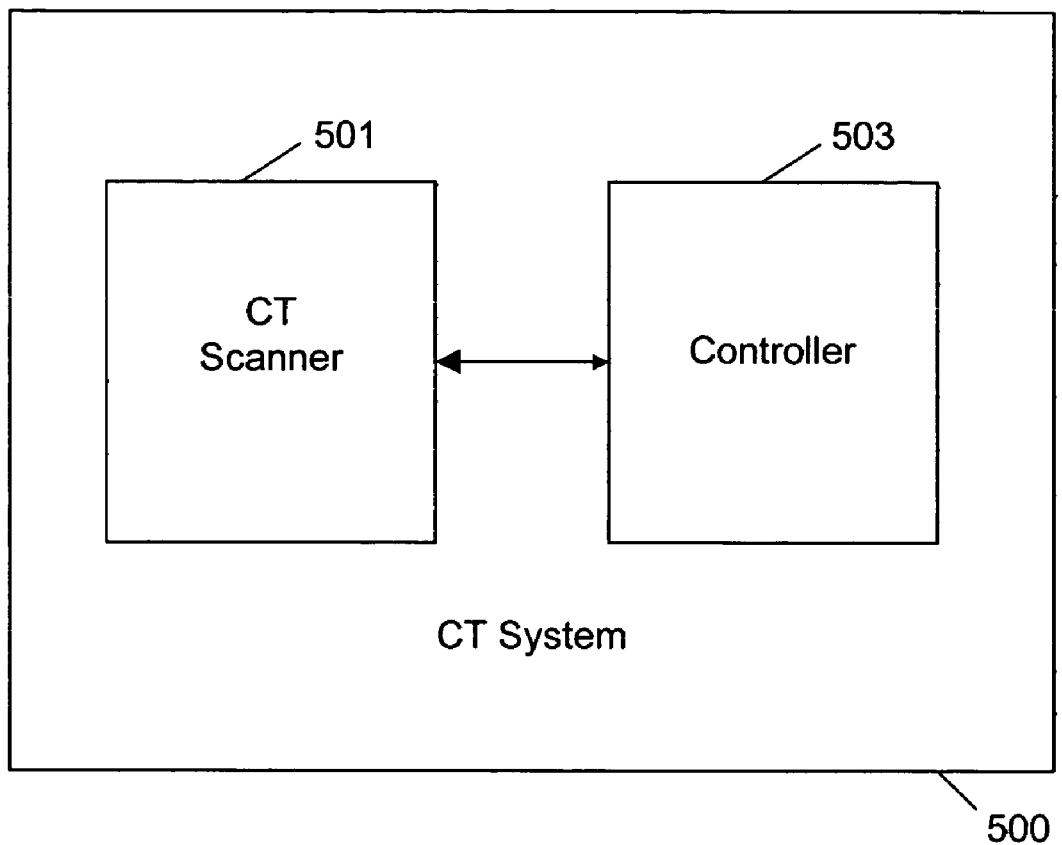
FIG. 5 is a block diagram depicting a CT system used to enhance an image, in accordance with an exemplary embodiment of the invention.

FIG. 5 is a block diagram depicting a CT system used to enhance an image, in accordance with an exemplary embodiment of the invention. CT system 500 includes a CT scanner 501 and a controller 503. In various embodiments, controller 503 controls the operation of CT scanner 501, and is configured to enhance a CT image, wherein the image includes a plurality of image pixels. The CT image is produced as a result of a scan performed by CT scanner 501. In various embodiments, controller 503 enhances the CT image by following the steps of segmenting the image by comparing an image pixel CT number to a set of predetermined thresholds; filtering the image pixels based on the comparison; and generating an output image based on the filtered image pixels.

In various embodiments of the invention, controller 503 is configured to perform a smoothing operation on the CT image in order to generate a smoothed image dataset and average the CT numbers of a plurality of adjacent pixels of the CT image. In addition, controller 503 is configured to perform a deconvolution operation on the CT image to generate a deconvolution image dataset.

In various embodiments of the invention, controller 503 is further configured to assign a CT number to an image pixel that is equal to a CT number of a corresponding pixel in the smoothed image dataset, if the CT number of the image pixel is less than or equal to a first predetermined threshold. Controller 503 assigns a CT number to an image pixel that is equal to a CT number of a corresponding image pixel, if the CT number of the image pixel is greater than or equal to a second predetermined threshold. Controller 503 further assigns a CT number to an image pixel that is equal to a CT number of a corresponding pixel in the deconvolution image dataset, if the CT number of the image pixel is greater than the first predetermined threshold and is less than the second predetermined threshold.

In various embodiments controller 503 is further configured to assign a CT number to an image pixel that is equal to a CT number, determined by using the CT number of a corresponding pixel of the smoothed image dataset, a corresponding pixel of the deconvolution image dataset, and a first transition scaling factor, if the CT number of the image pixel is greater than the first predetermined threshold and less than a first predetermined transition threshold. Controller 503 assigns a CT number to an image pixel that is equal to a CT number, determined by using the CT number of a corresponding pixel of the image pixels, a corresponding pixel of the deconvolution image dataset, and a second transition scaling factor, if the CT number of the image pixel is less than the second predetermined threshold and is greater than a second predetermined transition threshold. Controller 503 further assigns a CT number to an image pixel that is equal to a CT number of a corresponding pixel in the deconvolution image dataset, if the CT number of the image pixel is less than the second predetermined transition threshold and greater than the first predetermined transition threshold.

The various embodiments of the invention provide an improved post-processing image filter that enhances the contrast of minute objects in the image and reducing noise of the surrounding lung tissues. Further, the various embodiments of the invention provide an improved post-processing image filter for filtering medical images. The post processing image filter enables higher spatial resolution and better contrast noise ratio for tumor detection and sizing, while keeping the radiation dose fed to a patient low.

A technical effect of the invention is to provide enhanced images with increased high contrast resolution. Other technical effects include the reduction of noise of body parts such as lung tissues to enhance contrast to noise ratio enabling better visualization of body parts such as vessels and nodules in the lung.

The various embodiments or components thereof may be implemented as part of a computer system. The computer system may include a computer, an input device, a display unit and an interface, for example, for accessing the Internet. The computer may include a microprocessor. The microprocessor may be connected to a communication bus. The computer may also include a memory. The memory may include Random Access Memory (RAM) and Read Only Memory (ROM). The computer system further may include a storage device, which may be a hard disk drive or a removable storage drive such as a floppy disk drive, optical disk drive, and the like. The storage device can also be other similar means for loading computer programs or other instructions into the computer system.

As used herein, the term "computer" may include any processor-based or microprocessor-based system including systems using microcontrollers, reduced instruction set circuits (RISC), application specific integrated circuits (ASICs), logic circuits, and any other circuit or processor capable of executing the functions described herein. The above examples are exemplary only, and are thus not intended to limit in any way the definition and/or meaning of the term "computer".

The computer system executes a set of instructions that are stored in one or more storage elements, in order to process input data. The storage elements may also hold data or other information as desired or needed. The storage element may be in the form of an information source or a physical memory element within the processing machine.

The set of instructions may include various commands that instruct the processing machine to perform specific operations such as the processes of the various embodiments of the invention. The set of instructions may be in the form of a software program. The software may be in various forms such as system software or application software. Further, the software may be in the form of a collection of separate programs, a program module within a larger program or a portion of a program module. The software also may include modular programming in the form of object-oriented programming. The processing of input data by the processing machine may be in response to user commands, or in response to results of previous processing, or in response to a request made by another processing machine.

As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program.

While the invention has been described in terms of various specific embodiments, those skilled in the art will recognize that the invention can be practiced with modification within the spirit and scope of the claims.

What is claimed is:

1. A method of displaying an image comprising a plurality of image pixels, each image pixel having an associated CT number, said method comprising:
    receiving image data acquired using a computed tomography scanner;
    performing a smoothing operation on the image to generate a smoothed image dataset comprising a plurality of smoothed image pixels;
    performing a deconvolution operation on the image to generate a deconvolution image dataset comprising a plurality of deconvolution image pixels;
    assigning a filtered CT number to the plurality of smoothed image pixels that corresponds to respective pixels of the smoothed image dataset if the smoothed image pixel CT number is less than or equal to a first predetermined threshold;
    assigning a filtered CT number to the plurality of smoothed image pixels that corresponds to respective pixels of the image if the smoothed image pixel CT number is greater than or equal to a second predetermined threshold;
    assigning a filtered CT number to the plurality of smoothed image pixels that corresponds to respective pixels of the deconvolution image dataset if the smoothed image pixel CT number is greater than the first predetermined threshold and less than the second predetermined threshold;
    generating an output image based on the filtered CT number of the plurality of smoothed image pixels.

2. A method of displaying an image in accordance with claim 1 further comprising:
    assigning a filtered CT number to the plurality of smoothed image pixels wherein the filtered CT number is determined using corresponding pixels of the smoothed image dataset, corresponding pixels of the deconvolution image dataset, and a first selectable scaling factor, if the smoothed image pixel CT number is greater than the first predetermined threshold and less than a first predetermined transition threshold; and
    assigning a filtered CT number to the plurality of smoothed image pixels wherein the filtered CT number is determined using corresponding pixels of the image pixels, corresponding pixels of the deconvolution image dataset, and a second selectable scaling factor, if the smoothed image pixel CT number is greater than the second predetermined threshold and less than a second predetermined transition threshold.

3. A method of displaying an image in accordance with claim 2 further comprising assigning a CT number to an image pixel that is equal to a CT number of a corresponding pixel in the deconvolution image dataset if the CT number of the image pixel is less than the second predetermined transition threshold and is greater than the first predetermined transition threshold.

4. A method of displaying an image in accordance with claim 2 further comprising determining the first selectable scaling factor using an interpolation of the pixel CT number between the first predetermined threshold and the first predetermined transition threshold.

5. A method of displaying an image in accordance with claim 2 further comprising determining the second selectable scaling factor using an interpolation of the pixel CT number between the second predetermined threshold and the second predetermined transition threshold.

6. A method of displaying an image in accordance with claim 1 wherein generating an output image further comprises modulating a pixel CT number of an output image dataset as a function of pixel location in the output image dataset.

7. A method of displaying an image in accordance with claim 6 further comprising applying a gain factor to the filtered CT number using an associated pixel location relative to a center of the image.

8. A method in accordance with claim 6 wherein modulating a pixel CT number of an output image dataset further comprises:
    assigning a gain factor of approximately 1.0 to the output image dataset corresponding to pixels at a center of the image; and
    assigning a gain factor of approximately zero to the output image dataset corresponding to pixels at an edge of the image.

9. A method in accordance with claim 6 wherein modulating a pixel CT number of an output image dataset further comprises assigning a gain factor to the output image dataset using a polynomial expression based on a pixel location relative to a center of the image.

10. A method in accordance with claim 1 further comprising segmenting the smoothed image dataset using the CT numbers associated with the image pixels.

11. A method in accordance with claim 10 wherein segmenting the smoothed image dataset further comprises comparing an image pixel CT number to a predetermined threshold.

12. A method in accordance with claim 1 further comprising filtering the plurality of image pixels by applying a different filter to each segment of image pixels based on at least one of the first predetermined threshold and the second predetermined threshold.

13. A computed tomography (CT) system comprising:
a computed tomography scanner; and
a controller for controlling an operation of the computed tomography scanner, said controller configured to enhance a CT image wherein the CT image comprises a plurality of image pixels, said controller further configured to:
  assign a filtered CT number to a plurality of smoothed image pixels that corresponds to respective pixels of a smoothed image dataset if a smoothed image pixel CT number is less than or equal to a first predetermined threshold;
  assign a filtered CT number to the plurality of smoothed image pixels that corresponds to respective pixels of the CT image if the smoothed image pixel CT number is greater than or equal to a second predetermined threshold;
  assign a filtered CT number to the plurality of smoothed image pixels that corresponds to respective pixels of a deconvolution image dataset if the smoothed image pixel CT number is greater than the first predetermined threshold and less than the second predetermined threshold; and
  generate an output image based on the filtered CT number of the plurality of smoothed image pixels.

14. A CT system in accordance with claim 13 wherein said controller is further configured to:
  perform a smoothing operation on the image to generate the smoothed image dataset comprising the plurality of smoothed image pixels; and
  perform a deconvolution operation on the image to generate the deconvolution image dataset comprising a plurality of deconvolution image pixels.

15. A CT system in accordance with claim 13 wherein said controller is further configured to:
  assigning a filtered CT number to the plurality of smoothed image pixels wherein the filtered CT number is determined using corresponding pixels of the smoothed image dataset, corresponding pixels of the deconvolution image dataset, and a first selectable scaling factor, if the smoothed image pixel CT number is greater than the first predetermined threshold and less than a first predetermined transition threshold;
  assigning a filtered CT number to the plurality of smoothed image pixels wherein the filtered CT number is determined using corresponding pixels of the image pixels, corresponding pixels of the deconvolution image dataset, and a second selectable scaling factor, if the smoothed image pixel CT number is greater than the second predetermined threshold and less than a second predetermined transition threshold; and
  assigning a CT number to an image pixel that is equal to a CT number of a corresponding pixel in the deconvolution image dataset if the CT number of the image pixel is less than the second predetermined transition threshold and is greater than the first predetermined transition threshold.

16. A CT system in accordance with claim 13 wherein said controller is further configured to apply a gain factor to the filtered CT number using an associated pixel location relative to a center of the image.

* * * * *

UNITED STATES PATENT AND TRADEMARK OFFICE
CERTIFICATE OF CORRECTION

PATENT NO.       : 7,609,870 B2                                  Page 1 of 1
APPLICATION NO.  : 10/925317
DATED            : October 27, 2009
INVENTOR(S)      : Jianying Li It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1464 days.

Signed and Sealed this

Twelfth Day of October, 2010

David J. Kappos
*Director of the United States Patent and Trademark Office*